United States Patent [19]
Iwaki et al.

[11] Patent Number: 4,958,883
[45] Date of Patent: Sep. 25, 1990

[54] AUTOMOTIVE DOOR TRIM MOUNTING STRUCTURE

[75] Inventors: Tetsuhiro Iwaki, Aki; Hazime Seikaku, Hiroshima, both of Japan

[73] Assignee: Mazda Motor Corporation, Hiroshima, Japan

[21] Appl. No.: 386,592

[22] Filed: Jul. 31, 1989

[30] Foreign Application Priority Data

Jul. 29, 1988 [JP] Japan .............................. 63-99875[U]

[51] Int. Cl.$^5$ .............................................. B60J 5/00
[52] U.S. Cl. .................................... 296/152; 296/146; 49/383
[58] Field of Search ....................... 296/39.1, 146, 152; 280/751; 49/383

[56] References Cited

U.S. PATENT DOCUMENTS 4,405,173  9/1983  Piano ..................................... 296/146
4,804,223  2/1989  Iati ........................................ 296/152

FOREIGN PATENT DOCUMENTS 64350    4/1984  Japan .
37530    2/1986  Japan ..................................... 296/146
2149726  6/1985  United Kingdom ................. 296/146

Primary Examiner—Margret A. Focarino
Assistant Examiner—Andrew C. Pike
Attorney, Agent, or Firm—Wenderoth, Lind & Ponack

[57] ABSTRACT

An automotive door trim mounting structure comprises a center pillar disposed between a front door and a rear door, and has the rear door hinged to be opened and closed. A rear door trim includes a main body portion mounted to an interior side of the rear door to cover the interior side, and an extension formed at the front end of the main body portion which extends toward the front door so as to cover the interior side of the center pillar. As the center pillar is covered with the rear door trim, the front and rear door trims appear as if they are continuous, thus obtaining a preferred interior design for the automobile. The extension of the rear door trim has a surface opposing the center pillar so as to cover the center pillar, and also the center pillar has a surface opposing the extension of the rear door trim; and one or both of such opposing surfaces are provided with an elastic member so that fingers, if caught between the extension of the door trim and the center pillar, will be protected by the elastic member.

19 Claims, 5 Drawing Sheets

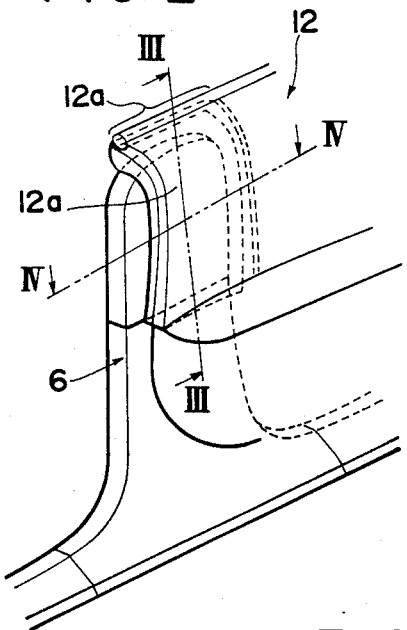
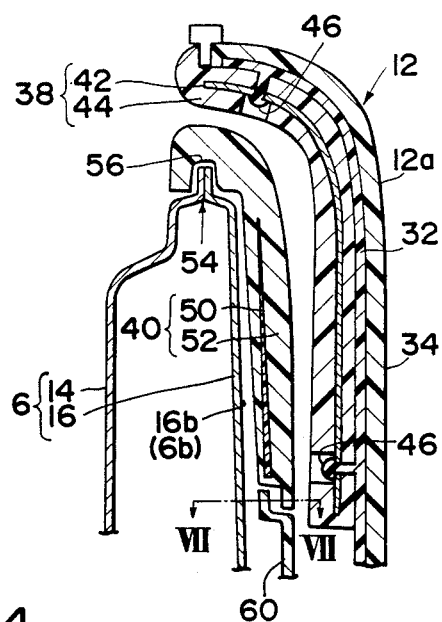
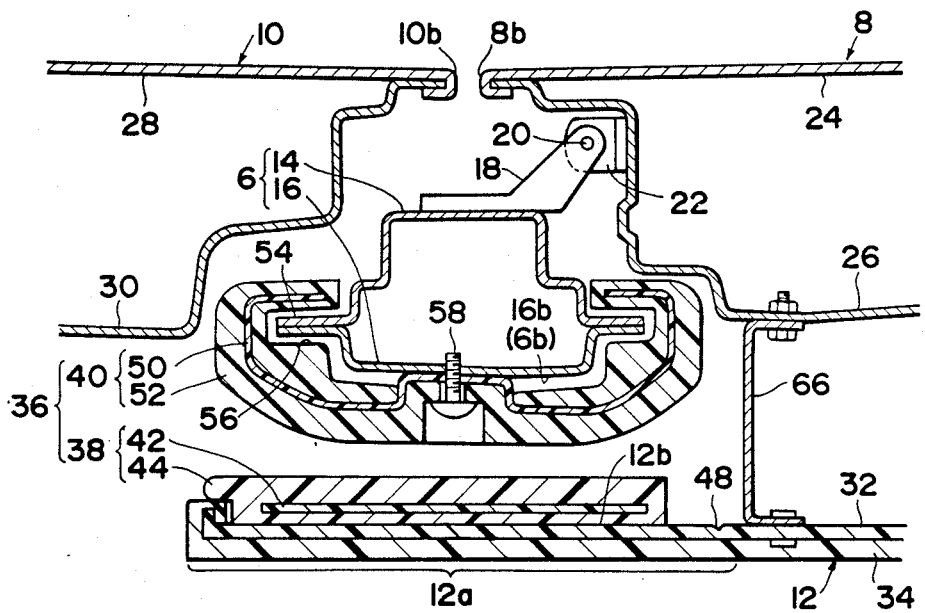

AUTOMOTIVE DOOR TRIM MOUNTING STRUCTURE

BACKGROUND OF THE INVENTION

1. Field of the Invention

The present invention relates to an automotive door trim mounting structure and, more particularly, to an automotive door trim mounting structure for mounting a rear door trim with a front end thereof extended forwardly such that a center pillar will be covered with such extended section.

2. Prior Art

Generally, a four-door automobile has center pillars between front doors and rear doors. The rear door is pivotally mounted by door hinges to the center pillar. On the interior sides of the front door, the rear door, and the center pillar, door trims and center pillar trims covering the metal surfaces thereof are installed for the purpose of improving the appearance of the interior of a automobile passenger compartment (Laid-Open Japanese Utility Model No. 59-64350).

In recent years, there has been manufactured many a so-called center-pillarless hardtop automobile, in which center pillars are formed with their top ends only as high as the door window section; that is, the upper portion of the center pillar is cut off, thereby providing as wide a glass surface area as possible to improve the feeling of roominess.

However, since there is provided a clearance between trims which is necessary for the opening and closing of the door, the clearance appears as a parting line in the interior and also the center pillar is conspicuous, resulting in a discontinuous surface of the interior and, accordingly, a degraded interior design.

SUMMARY OF THE INVENTION

Accordingly, it is an object of the present invention to provide a door trim mounting structure capable of solving the above-mentioned problem by forming an extension by way of extending the front end of a rear door trim toward the front of a vehicle body, and by covering at least the upper portion of the center pillar with this extension.

It is another object of the present invention to provide a high-safety automotive door trim mounting structure, whereby a passenger's finger or fingers will never get hurt if pinched between the extension formed at the front end of the rear door trim and the center pillar covered with this extension.

To attain the above objects, the automotive door trim mounting structure of the present invention has the center pillar, located between the front door and the rear door, hingedly supporting the rear door; and the rear door trim comprises a trim main body portion mounted to cover the interior side of the rear door, and an extension extending toward the front door to cover the interior of the center pillar, at the front end of the main body portion of the rear door trim.

According to the door trim of the above-described constitution, as the center pillar is covered with the rear door trim, the front and rear door trims look as if they are continuous, thus obtaining preferred design of the interior.

To accomplish another object of the present invention, the extension of the rear door trim has a surface opposing the center pillar so that the extension covers the center pillar, and also the center pillar has a surface opposing the extension of the rear door trim. Either or both of these surfaces opposing each other is/are fitted with an elastic member.

Therefore, a finger or fingers, if pinched between the extension of the door trim and the center pillar, can be protected by means of the elastic member mounted on at least one of the extension of the door trim and the center pillar.

The elastic member mounted on the rear door trim may be formed of a core material of synthetic resin and an elastic material of soft synthetic resin covering the core material. Furthermore, the elastic material attached to the center pillar may be a core material of synthetic resin and an elastic material of soft synthetic resin which covers the core material. And furthermore, the elastic material of the elastic member installed on the center pillar may be produced of a soft material which is soft to the touch.

Window sections are defined in the rear and front doors. The center pillar is formed lower than the window sections so that it will not protrude into the window sections, and the top end portion of the center pillar is positioned lower than the window sections. The extension of the rear door trim may be formed to extend upwardly to cover the top end portion of the center pillar. Also, the extension of the rear door trim may be formed to have a vertical dimension less than that of the main body portion and to extend from an upper position of the front end of the main body portion so that the rear door trim may cover at least the upper part of the interior side of the center pillar.

The rear door trim is formed of a core material of synthetic resin extending from the main body portion to the extension and a skin member installed on the surface of the core material. A groove may be formed in the core of the rear door trim to extend in the direction of the height of the center pillar, at the boundary between the main body portion of the rear door trim and the extension, such that the extension can be folded relative to the main body portion.

Furthermore, a center pillar trim may be mounted on and may cover the interior side of the center pillar, and the extension of the rear door trim extends to cover the top end portion and at least the upper portion of the interior side of the center pillar trim. An insulator also may be mounted to mating surfaces of the center pillar and the center pillar trim. Furthermore, an elastic member to be used as a part of a seam welt of a center pillar trim may be mounted to the center pillar.

Also, the center pillar trim may be installed on and may cover the interior side of the center pillar, the extension of the rear door trim may be formed to extend to the front edge of the center pillar trim, covering the upper end portion and at least the upper part of the interior side of the center pillar trim, and an elastic member may be provided, in the vicinity of the front edge portion of the center pillar trim, at the front end portion of the extension, so as to fill a gap between the extension and the center pillar trim when the rear door is closed.

Furthermore, the extension of the rear door trim may be formed to extend to the vicinity of the front door trim so that, with the front door trim mounted on and covering the interior side of the front door, a gap extending in the direction in which the front door trim and the extension meet will be small when the front and rear doors are in closed positions.

BRIEF DESCRIPTION OF THE DRAWINGS

FIG. 2 is an enlarged view of a center pillar section in FIG. 1;

FIG. 3 is a sectional view taken along line III—III in FIG. 2;

FIG. 4 is a sectional view taken along line IV—IV in FIG. 2;

DESCRIPTION OF PREFERRED EMBODIMENTS

Hereinafter exemplary embodiments of an automotive door trim mounting structure according to the present invention will be described with reference to the accompanying drawings.

Figure 1:
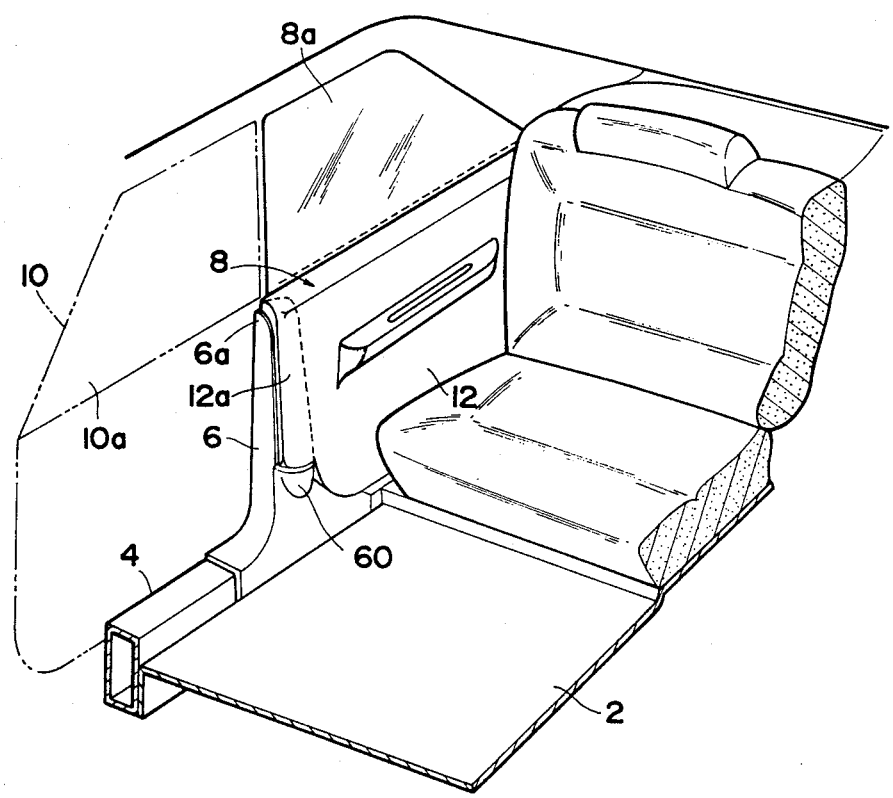
FIG. 1 is a perspective view of the interior of a passenger compartment showing a rear seat area of a center-pillarless hardtop automobile according to a first embodiment of the invention.
Figure 5:
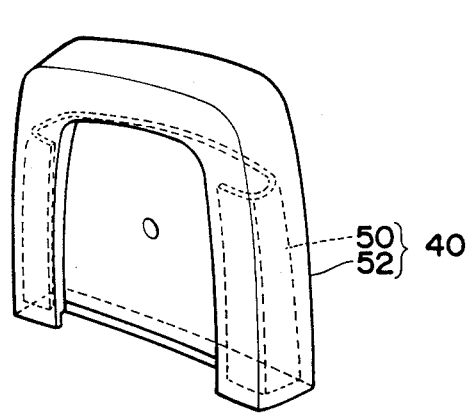
FIG. 5 is a perspective view of an elastic member for the center pillar.
Figure 6:
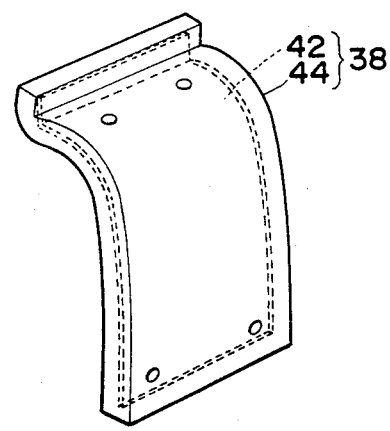
FIG. 6 is a perspective view of an elastic member for the rear door trim.

FIG. 1 is a perspective view of a rear seat in an automobile interior according to a first embodiment. In this drawing, numeral 2 is a floor panel; numeral 4 is a side sill extending longitudinally of a vehicle body; numeral 6 is a center pillar fixed on the side sill 4; numeral 8 is a rear door pivotally mounted to the center pillar 6; and numeral 10 is a front door pivotally mounted on a front pillar (not shown).

As illustrated, this automobile is a so-called center-pillarless hardtop automobile, in which the upper portion of the center pillar 6 is cut off, with the upper end portion 6a of the center pillar 6 ending lower than the window sections 8a and 10a of the rear door 8 and the front door 10, respectively.

On the interior side of the rear door 8 is mounted a door trim 12. The front end portion of door trim 12 has an extension 12a extended toward the front of the vehicle body and covering the interior surface of the center pillar 6.

FIG. 2 is an enlarged view of the center pillar 6 section and FIGS. 3 and 4 show sectional views taken along lines III—III and IV—IV in FIG. 2, respectively. As shown in these drawings, the center pillar 6 is formed in a closed section by joining a pillar outer panel 14 and a pillar inner panel 16.

The rear door 8 is openably installed to the center pillar 6 by hinge arms 18 secured to the pillar outer panel 14 through a hinge pin 20 and a hinge pin support bracket 22. Rear door 8 is formed by joining a door outer panel 24 and a door inner panel 26.

The front door 10 pivotally mounted to the front pillar, not illustrated, is also formed by joining a door outer panel 28 and a door inner panel 30. The rear edge 10b of front door 10 and the front edge 8b of the rear door 8 are nearly butted with a clearance provided therebetween on the outer side of the center pillar 6.

The rear door trim 12 attached on the interior side of the rear door 8 is a unitary formed structure comprising a plastic core material 32 on the surface of which a surface member 34 is attached by affixing or other attaching means, and installed to the door inner panel 26 of the rear door 8 with trim mounting fasteners 66 and a plurality of reference pins and clips which are not illustrated.

The extension 12a at front end of the rear door trim 12 is formed at the upper half part thereof and extends toward the front of the vehicle body as far as the front end of the center pillar 6. The interior surface of the upper part of the center pillar 6 is covered with the extension 12a of the rear door trim 12.

At least one of the surface 12b of extension 12a and the surface 6b of the center pillar 6, which are opposed each other, is provided with an elastic member 36. In this embodiment, both such surfaces are provided with elastic members 38 and 40.

As illustrated, on surface 12b, which is the back side of the extension 12a of the rear door trim 12 outside of the interior, is fitted the plate-like elastic member 38 nearly over the whole length of the extension 12a. This elastic member 38 is a unitary formed member made by covering the outside of a relatively rigid plastic core material 42 with an elastic member 44 such as soft vinyl chloride. In this elastic member 38, the core material 42 is retained by retaining pins 46 projectingly formed integral with core material 32 of the extension 12a of the rear door trim 12. The heads of these retaining pins 46 are designed to be hot-clinched. Also, in the surface 12b on the base end of the extension 12a of the rear door trim 12 is formed a V groove 48 to provide extension 12a with flexibility. Groove 48 is cut in a portion of the core 32 aligned approximately vertically along the rear end of the center pillar 6.

On the other hand, at the upper part of the center pillar 6 covered with the extension 12a described above is provided the sack-like elastic member 40 covering the pillar inner panel 16. This elastic member 40 is also composed of a comparatively rigid plastic core material 50 and an elastic material 52 such as soft vinyl chloride covering the outside of core material 50. A joint 54 between the pillar outer panel 14 and the pillar inner panel 16 is fitted and retained in an engaging groove 56 formed in the inner periphery of member 40, and is fastened at the center thereof to the pillar inner panel 16 by a screw 58.

Figure 7:
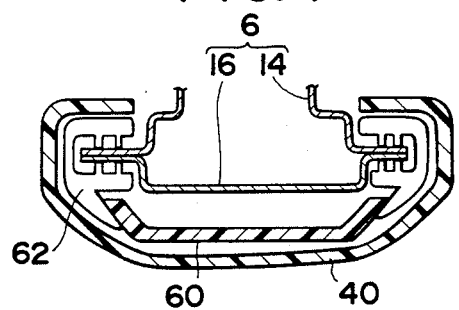
FIG. 7 is a sectional view taken along line VII—VII in FIG. 3.

The lower half part of the center pillar 6, not covered with the extension 12a of the rear door trim 12, is exposed to the interior of the vehicle. As shown in FIG. 7, however, the lower half part of center pillar 6 is fitted with a center pillar trim 60 and a seaming welt 62 as in conventional door trims, and its end surface is covered. The upper end portion of this center pillar trim 60 is designed to be retained at the lower end portion of the elastic member 40.

Therefore, according to the automotive door trim mounting structure of the above-described configuration, the front and rear door trims appear as if continued when the front and rear doors are closed, thus improving the interior design of the automobile. Besides, since there is formed a groove 48 for maintaining the flexibility of the extension 12a, in the base end side of the extension 12a of the rear door trim 12, fingers will never get hurt if pinched between the center pillar 6 and the extension 12a of the rear door trim 12 when the rear door 8 is shut, because the extension 12a is folded inwardly along the groove 48 to prevent the application of an excessive force to the fingers. Furthermore, since the elastic members 40 and 38 are used on the opposite surfaces 16b and 12b of the interior surface of the pillar inner panel 16 of the center pillar 6 and the back of the extension 12a of the rear door trim 12, respectively, fingers, if accidentally inserted between these opposite surfaces 16b and 12b, will be only softly pressed by these elastic members 38 and 40. Thus, safety is highly improved for the protection of fingers from injury.

For the elastic member 40 used on the center pillar 6, an extremely soft material is adopted, so that a passenger putting his hand on the elastic member 40 will feel unsteady, and accordingly will abstain from putting his hand on the elastic member 40, thus preventing his fingers from being pinched by the extension 12a of the rear door trim 12.

Figure 8:
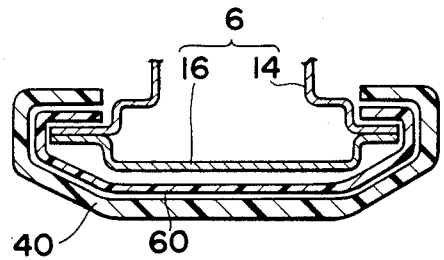
FIG. 8 is a sectional view of a modification of a portion equivalent to FIG. 7.

As shown in FIG. 8, the elastic member 40 on the center pillar 6 may be used as a part of the seaming welt of the center pillar trim 60 attached at the lower part of the center pillar 6.

The elastic member 36 may be provided on at least one of the opposed surfaces of the center pillar 6 and the extension 12a of the rear door trim 12. When the elastic member 38 is used only on the back side of the rear door trim 12, an existing center pillar trim may be used on the center pillar 6 side.

Figure 9:
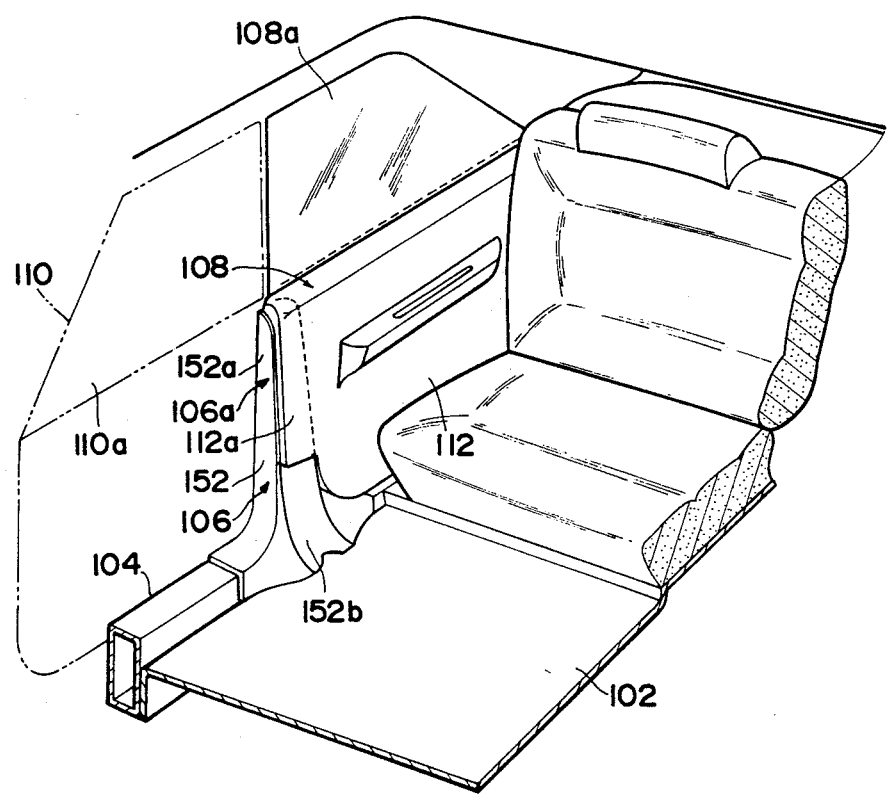
FIG. 9 is a perspective view of a rear seat section of a center-pillarless hardtop automobile according to a second embodiment of the invention.

FIGS. 9 to 12 show a second embodiment. FIG. 9 is a perspective view of the area of the rear seat in the interior as in FIG. 1. In this drawing, numeral 102 is a floor panel; numeral 104 is a side sill extending in the longitudinal direction of the vehicle body; numeral 106 is a center pillar secured to the side sill 104; numeral 108 is a rear door pivotally mounted on the center pillar 106; and numeral 110 is a front door pivotally mounted on the front pillar (not shown).

As shown in the drawing, this automobile is a so-called center-pillarless hardtop automobile, wherein the upper part of the center pillar 106 is cut off and the upper end portion 106a of the center pillar 106 is formed only up to the window sections 108a and 110a of the rear door 108 and the front door 110, respectively.

On the interior side of the rear door 108 is installed a door trim 112, which is formed extending at the front end thereof with an extension 112a extending toward the front of the vehicle body. The interior surface of the center pillar 106 is covered with extension 112a.

Figure 10:
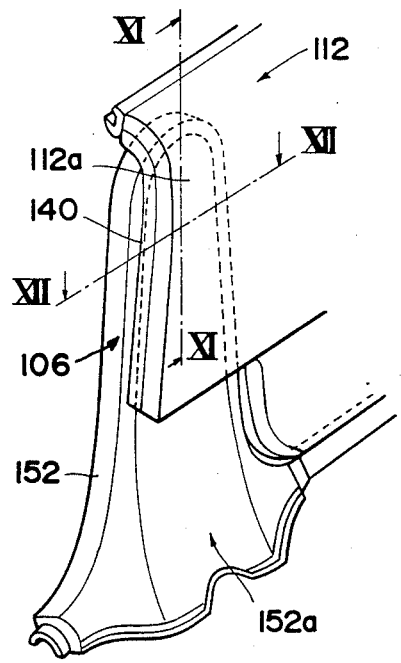
FIG. 10 is an enlarged view of a center pillar portion in FIG. 9.
Figure 11:
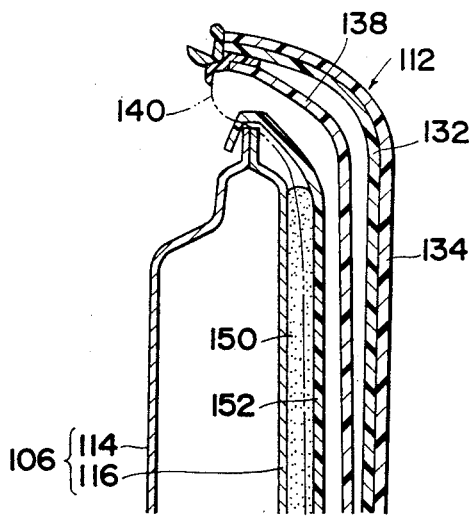
FIG. 11 is a sectional view taken along line XI—XI in FIG. 10.
Figure 12:
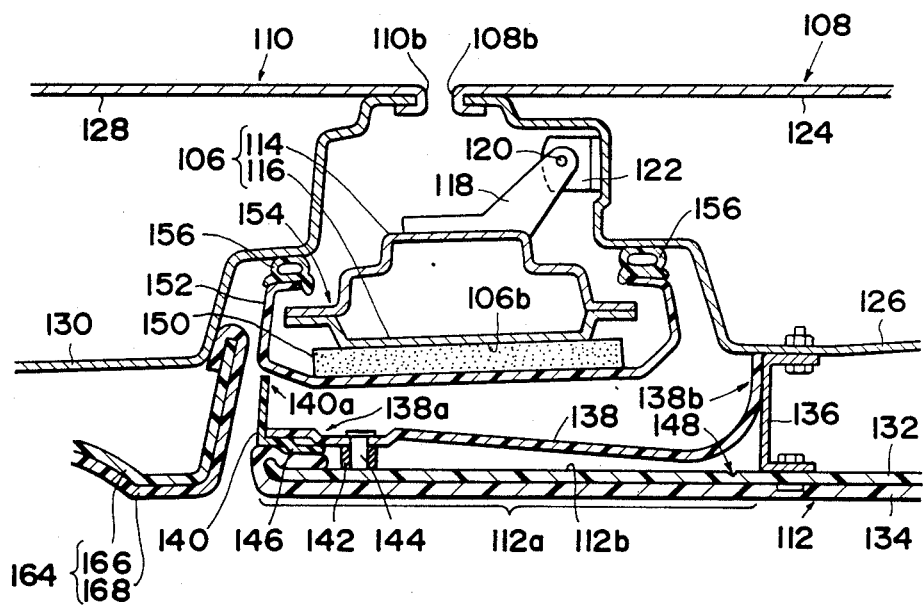
FIG. 12 is a sectional view taken along line XII—XII in FIG. 10.

FIG. 10 is an enlarged view showing the center pillar 106 section, and FIGS. 11 and 12 are sectional views taken along lines XI—XI and XII—XII in FIG. 10, respectively. As shown in these drawings, the center pillar 106 is formed in a closed section by joining a pillar outer panel 114 and a pillar inner panel 116.

The rear door 108 is mounted openably to the center pillar 106 by a hinge arm 118 secured to the pillar outer panel 114 through a hinge pin 120 and a hinge pin support bracket 122. Rear door 108 is formed by joining a door outer panel 124 and a door inner panel 126.

The front door 110 pivotally mounted to the front pillar, not shown, is also formed by joining a door outer panel 128 to a door inner panel 130, and is mounted with a rear edge 110b thereof nearly butted against a front edge 108b of the rear door 108 with a clearance provided longitudinally on the outer side of the center pillar 106 outside of the interior.

The rear door trim 112 mounted on the interior side of the rear door 108 is a unitary part formed by attaching a surface member 134 by affixing or other attaching means on the surface of a plastic core 132, and mounted to the door inner panel 126 of the rear door 108 by a mounting bracket 136 and a plurality of reference pins and clips not shown.

The extension 112a at the front end of the rear door trim 112 is formed of a height about three-quarters of the height of the rear door trim, and extends as far as the front end of the center pillar 106 toward the front of the vehicle body, such that the interior surface of the upper part of the center pillar 106 will be covered with the extension 112a of the rear door trim 112.

On a surface 112b on the back of the exterior side of the extension 112a of the rear door trim 112 is attached a plate-like plastic core 138 extending over nearly the whole surface of the extension 112a. A front end portion 138a of core 138 is connected to the core 132 by bolts 144 and nuts 142 provided on the core 132 of the extension 112a of the rear door trim 112, and the rear end portion 138b is bonded to mounting bracket 136. Between the front end portion 138a of the core 138 and the surface member 134 is installed an elastic member 140 through a receiving member 146. Elastic member 140 extends vertically such that an outer end 140a of the elastic member 140 will come into contact with a center pillar trim 152 when the rear door 108 is closed. On the surface 112b of the base end of the extension 112a of the rear door trim 112 is formed a groove 148 for providing the extension 112a with flexibility. Groove 148 is formed in a portion of the core 132 aligned approximately vertically along the rear end of the center pillar 106.

On the other hand, on the center pillar 106 is mounted the center pillar trim 152, covering the pillar inner panel 116. Center pillar trim 152 is attached and retained, at a part not shown, to a joint 154 between the pillar outer panel 114 and the pillar inner panel 116. Furthermore, on the outer side of a center portion of trim 152 is attached an insulator 150, which will come into contact with the pillar inner panel 116. On the end of the exterior side of the center pillar trim 152 are mounted seal members 156. The seal members 156 are designed to seal in contact with the inner panels 130 and 126 of the front door 110 and the rear door 108, respectively.

The lower part 152a of the center pillar trim 152 is expanded inwardly (FIG. 10) and is exposed to the interior without being covered with the extension 112a of the rear door trim 112. Also, on the interior side of the inner panel 130 of the front door 110 is installed a front door trim 164. The front door trim 164 is a unitary structure formed by attaching a surface material 168 to the surface of a plastic core material 168 to the surface of a plastic core material 166, and is installed to the inner panel 130 by a plurality of reference pins and clips not shown.

When the front door 110 and the rear door 108 are closed, the clearance between the front door trim 164 and the extension 112a of the rear door trim 112 is very narrow, for example 5 to 6 mm wide; both the trims, therefore, appear as if continued in a straight line. In this state, the clearance between both the trims is too narrow to pinch fingers.

In this case, however, there occurs a gap between the elastic member 140 installed on the extension 112a of the rear door trim 112 and the center pillar trim 152 when the rear door 108 is opened. Moreover, it is well conceivable that when the front door 110 is also open, fingers will accidentally slip into such gap. In this state, if the rear door 108 is closed, the elastic member 140 will softly press the fingers, thus protecting the fingers from injury. Of course, the gap between the center pillar trim 152 and the extension 112a of the rear door trim 112 is set to be of a size such that 1 the fingers, if inserted, never will be pinched.

According to the automotive door trim mounting structure of the present invention described above, because the extension 112a of the rear door trim 112 has a groove 148 on the base end side of the extension 112a to provide it with flexibility, the extension 112a will bend inwardly along the groove 148, preventing the exertion of an excess force to fingers inserted between the center pillar trim 152 and the extension 112a of the rear door trim 112 when the rear door 108 is closed.

The present invention, therefore, features the excellent design that the rear door trim is provided with an extension to cover the center pillars, and the extension and the front door trim approach in an aligned manner, thus appearing to be continuous between both the trims.

Furthermore, if fingers are caught between the extension of the rear door trim and the center pillar, an elastic member is installed on at least one of the opposed portions of the extension of the rear door trim and the center pillar, thereby improving safety for the protection of the fingers from injury.

What is claimed is:

1. An automotive door trim structure comprising: a center pillar disposed between a front door and a rear door and having said rear door hinged to be opened and closed; and a rear door trim including a main body portion mounted to an interior side of said rear door to cover said interior side, and an extension formed at a front end of said main body portion, said extension extending toward said front door so as to cover an interior side of said center pillar.

2. An automotive door trim structure as claimed in claim 1, wherein said extension of said rear door trim has a surface opposing said center pillar to cover said center pillar, and an elastic member is installed on said opposing surface.

3. An automotive door trim structure as claimed in claim 2, wherein said elastic member installed on said rear door trim comprises a core material of synthetic resin and an elastic material of soft synthetic resin which covers said core material.

4. An automotive door trim structure as claimed in claim 2, wherein said center pillar has a surface opposing said extension of said rear door trim, and an elastic member is installed on said opposing surface of said center pillar.

5. An automotive door trim structure as claimed in claim 4, wherein said elastic member installed on said center pillar comprises a core material of synthetic resin and an elastic material of soft synthetic resin which covers said core material.

6. An automotive door trim structure as claimed in claim 1, wherein said center pillar has a surface opposing said extension of said rear door trim, and an elastic member is installed on said opposing surface.

7. An automotive door trim structure as claimed in claim 6, wherein said elastic member installed on said center pillar comprises a core material of synthetic resin and an elastic material of soft synthetic resin which covers said core material.

8. An automotive door trim structure as claimed in claim 7, wherein said elastic material of said elastic member installed on said center pillar comprises a soft material which is soft to the touch.

9. An automotive door trim structure as claimed in claim 1, wherein said rear door and said front door have a window portion defined thereby; said center pillar is formed lower than said window portion so that said center pillar does not project into said window portion; and an upper end portion of said center pillar is positioned lower than said window portion.

10. An automotive door trim structure as claimed in claim 9, wherein said extension of said rear door trim is formed to extend upwardly to and to cover said upper end portion.

11. An automotive door trim structure as claimed in claim 1, wherein said extension of said rear door trim has a shorter vertical dimension than that of said main body portion from an upper position of the front end of said main body portion of said rear door trim, to cover at least an upper part of the interior side of said center pillar.

12. An automotive door trim structure as claimed in claim 1, wherein said rear door trim comprises a core material of synthetic resin extending from said main body portion to said extension, and a surface member installed on a surface of said core material.

13. An automotive door trim structure as claimed in claim 12, wherein said core material of said rear door trim has a vertical groove in a boundary portion between said main body portion and said extension so that said extension may be bent relative to said main body portion.

14. An automotive door trim structure as claimed in claim 1, wherein said center pillar has a center pillar trim mounted on and covering the interior side thereof, and said extension of said rear door trim is formed to extend and to cover an upper end portion of said center pillar trim and at least an upper part of an interior side of said center pillar trim.

15. An automotive door trim structure as claimed in claim 14, wherein said center pillar and said center pillar trim have opposing surfaces, and an insulator is mounted between said opposing surfaces.

16. An automotive door trim structure as claimed in claim 14, wherein an elastic member serving also as a part of a seaming welt of said center pillar trim is installed on said center pillar.

17. An automotive door trim structure as claimed in claim 1, wherein said center pillar has a center pillar trim so mounted as to cover the interior side thereof; said extension of said rear door trim is formed to extend to a front edge portion of said center pillar trim so that said extension covers an upper end portion of said center pillar trim and at least an upper part of an interior side of said center pillar trim; and an elastic member is installed at a front end portion of said extension in a vicinity of said front edge portion of said center pillar trim so as to cover a clearance between said extension and said center pillar trim when said rear door is closed.

18. An automotive door trim structure as claimed in claim 1, wherein said front door has a front door trim mounted on and covering an interior side of said front door; and said extension of said rear door trim is formed to extend to a position close to said front door trim so that a clearance along a direction in which said front door trim and said extension are aligned is slight when said front door and said rear door are both in a closed position.

19. An automotive door trim structure comprising: a center pillar disposed between a front door and a rear door and having said rear door hinged to be opened and closed; a center pillar trim installed on said center pillar to cover an interior side thereof; a front door trim installed on said front door to cover an interior side thereof; a rear door trim including a main body portion installed on said rear door so as to cover an interior side thereof, and an extension formed at a front end of said main body portion, extending to a front edge portion of said center pillar trim, adjacent to said front door trim, so as to cover an upper end portion of said center pillar trim and at least an upper part of an interior side of said center pillar trim and also to reduce a clearance along a direction in which said rear door trim may be aligned with said front door trim when said front door and said rear door are both closed; and an elastic member provided at a front end portion of said extension of said rear door trim, adjacent to said front edge portion of said center pillar trim so that a gap between said extension and said center pillar trim will be closed when said rear door is closed.

* * * * *

UNITED STATES PATENT AND TRADEMARK OFFICE
CERTIFICATE OF CORRECTION

PATENT NO. : 4,958,883
DATED : September 25, 1990
INVENTOR(S) : Tetsuhiro IWAKI and Hazime SEIKAKU It is certified that error appears in the above-identified patent and that said Letters Patent is hereby corrected as shown below:

Column 1, line 21, change "a" to -- the --.

Column 5, line 48, delete "extending".

Column 8 (Claim 10), line 17, between "portion" and "." insert
-- of said center pillar --.

Signed and Sealed this

Seventh Day of April, 1992

Attest:

HARRY F. MANBECK, JR.

*Attesting Officer*　　　　　　*Commissioner of Patents and Trademarks*